United States Patent
Smith et al.

(10) Patent No.: US 8,194,544 B2
(45) Date of Patent: Jun. 5, 2012

(54) NETWORK DELAY SHAPING SYSTEM AND METHOD FOR BACKHAUL OF WIRELESS NETWORKS

(75) Inventors: Roland A. Smith, Nepean (CA); Chris Williams, Nepean (CA); Stephen Rayment, Ottawa (CA)

(73) Assignee: BelAir Networks Inc., Kanata, Ontario (CA)

( * ) Notice: Subject to any disclaimer, the term of this patent is extended or adjusted under 35 U.S.C. 154(b) by 987 days.

(21) Appl. No.: 11/938,396

(22) Filed: Nov. 12, 2007

(65) Prior Publication Data

US 2010/0278140 A1 Nov. 4, 2010

Related U.S. Application Data

(60) Provisional application No. 60/866,961, filed on Nov. 22, 2006.

(51) Int. Cl.
*G01R 31/08* (2006.01)
*H04Q 7/00* (2006.01)

(52) U.S. Cl. ........................ 370/231; 370/235
(58) Field of Classification Search .................. None
See application file for complete search history.

(56) References Cited

U.S. PATENT DOCUMENTS

| | | | |
|---|---|---|---|
| 6,947,756 B2 | 9/2005 | Khan et al. | |
| 7,684,527 B2 * | 3/2010 | Yokoyama | 375/347 |
| 2003/0031210 A1 * | 2/2003 | Harris | 370/516 |
| 2004/0240438 A1 | 12/2004 | Grossman | |
| 2005/0288012 A1 | 12/2005 | Morgan | |
| 2006/0003767 A1 * | 1/2006 | Kim et al. | 455/436 |
| 2006/0203737 A1 | 9/2006 | Bugenhagen | |
| 2006/0246905 A1 * | 11/2006 | Sakuma et al. | 455/438 |
| 2006/0250953 A1 | 11/2006 | Mooney et al. | |
| 2007/0129085 A1 * | 6/2007 | Kennedy, Jr. | 455/456.2 |
| 2007/0133417 A1 * | 6/2007 | LeBlanc | 370/235 |
| 2008/0031131 A1 * | 2/2008 | Bordonaro et al. | 370/230 |
| 2008/0062944 A1 * | 3/2008 | Smith et al. | 370/342 |
| 2008/0076406 A1 * | 3/2008 | Chen et al. | 455/424 |
| 2008/0076432 A1 * | 3/2008 | Senarath et al. | 455/442 |
| 2008/0084856 A1 * | 4/2008 | Ramachandran | 370/342 |
| 2008/0084900 A1 * | 4/2008 | Dunn | 370/516 |
| 2008/0214177 A1 * | 9/2008 | Sehedic et al. | 455/422.1 |

OTHER PUBLICATIONS

Written Opinion of the International Searching Authority for PCT/CA2007/002025.
International Search Report for PCT/CA2007/002025.

* cited by examiner

*Primary Examiner* — Hassan Phillips
*Assistant Examiner* — Eunsook Choi
(74) *Attorney, Agent, or Firm* — Katten Muchin Rosenman, L.L.P.

(57) ABSTRACT

A distributed or centralized network backhaul delay system includes a plurality of cellular base transceiver stations. Each cellular base transceiver station includes a network backhaul delay element. The network backhaul delay element is configured to calculate delay information associated with network delays between cell sites. The network backhaul delay element is configured to adjust and shape the relative network delays to minimize network delays between cell sites to enable soft handoff to be performed.

15 Claims, 6 Drawing Sheets

NETWORK DELAY SHAPING SYSTEM AND METHOD FOR BACKHAUL OF WIRELESS NETWORKS

CROSS-REFERENCE TO RELATED APPLICATIONS

This patent application claims priority to Provisional U.S. Patent Application Ser. No. 60/866,961, filed on Nov. 22, 2006, the contents of which are incorporated herein in their entirety.

BACKGROUND OF THE INVENTION

1. Field of the Invention

The present invention relates to network management. More particularly, the present invention relates to a network delay shaping system and method for backhaul of wireless networks.

2. Background Information

Wireless mesh backhaul, particularly those using frame-based protocols such as I.E.E.E. 802.16, WiMAX, or the like, are starting to be employed to wirelessly transport data from multiple cellular radio sites, or base transceiver stations (BTS), to a single or multiplicity of redundant network access or egress points. The data from these multiple BTS sites is then aggregated for wire-line transport to one or more centralized offices (CO) to be processed and switched into the larger regional and national networks. Aggregation enables economies of scale, because the price per wire-line transported bit is reduced as more bits are leased. For example, in conventional networks, most cell BTS sites are maintained using one to three digital signal 1 (DS1, e.g., T1 or E1) circuits. With aggregation, DS3 circuits capable of carrying 28 DS1 circuits can be leased at a rate equivalent to eight DS1s. Wireless backhaul solutions therefore become cost effective when just a few BTS cell sites carrying eight or more DS1 circuits are aggregated. The same economies of scale are true for packet based networks, where a single 100 Mbps data pipe can be leased for the equivalent of four 10 Mbps data pipes.

Wireless transport, especially frame based wireless protocols such as WiMAX and the like, have significantly more delay that wired networks. WiMAX networks, with frame sizes of 2.5 ms, 4 ms, 5 ms, 7.5 ms, 10 ms, and 20 ms, usually add delays that are on the order of 1.25 to 1.75 frames for a single wireless hop, in addition to the "speed of light" delays proportional to distance from the BTS to the CO site. Wired transport backhaul networks delays are driven mostly by "speed of light" (or equivalent speed of electrical propagation in wire) delays. Both wired and wireless networks add lesser delays for "line rate" switching of the packets or circuits. These delays are typically of the order of tens to hundreds of microseconds and have a minimal effect on the overall network delay.

The code division multiple access (CDMA) network protocol requires strict relative delays between BTS sites to enable seamless or "soft" handoff of active calls. Soft handoff is characterized by commencing communications with a new BTS site on the same CDMA frequency assignment before terminating communications with an old BTS site. Soft handoffs can be simplified as a "make before break" handoff, where there is no interruption in communications. If soft handoff cannot be achieved, then the result is a "hard" handoff, characterized by a temporary disconnection of the traffic channel. Hard handoffs can be simplified as a "break before make" handoff, where there is a temporary break in communications. Hard handoffs occur when the mobile station is transferred between disjoint active sets, when the CDMA frequency assignment changes, when the frame offset changes, or, less commonly, when the mobile is directed to an analogue voice channel, all of which are less preferred than soft handoffs.

SUMMARY OF THE INVENTION

A network delay shaping system and method for backhaul of wireless networks are disclosed. More particularly, exemplary embodiments of the present invention are directed to a distributed network backhaul delay architecture. Such an architecture includes a plurality of network delay elements that are incorporated both in wired and wirelessly connected cellular base transceiver "cell sites" to allow the network delay to be adjusted and shaped so as to minimize overall and differential network delays between cell sites to enable soft handoff to be performed. A large number of network delay elements and pseudowire controllers that have been added as network elements in the present architecture are simultaneously accessible to a network management system. The network management system can manage the network delays directly, such as through a direct connection, or indirectly, such as through an indirect connection. Delay information is calculated by the network delay elements, both statically during network setup, and dynamically during network operation, enabling changes in network topology resulting from mesh network reconfigurations to be monitored and measured and then used by the network management system to compensate for the new network delays.

Accordingly, in one aspect, the present invention provides a distributed network backhaul delay system. The system comprises a plurality of cellular base transceiver stations, wherein each cellular base transceiver station includes a network backhaul delay element. The network backhaul delay element is configured to adjust and shape relative network delays to minimize network delays between cell sites to enable soft handoff to be performed. The network backhaul delay element may be configured to calculate delay information associated with network delays between cell sites.

Each cellular base transceiver station may be associated with a pseudowire controller. The pseudowire controller may be configured to perform pseudowire conversions, and/or to modify a pseudowire jitter buffer size to alter the network delays between the cell sites. Each cellular base transceiver station may include a pseudowire controller.

The system may further include a network management device configured to manage the network delays. The network management device may be further configured to adjust and shape the network delays to minimize overall and differential network delays between cell sites. The network management device may be further configured to use the delay information to monitor and measure changes in network topology resulting from network reconfigurations. The network management device may be further configured to use the delay information to compensate for the network delays.

The network backhaul delay element may be further configured to modify packet sizes of packets communicated within the network to alter the network delays between the cell sites. Substantially all packets in a data stream may be delayed by a predetermined duration. The network delays may be shaped such that the largest delays correspond to the most interior areas of cellular coverage. The network may include wireless mesh backhaul links.

In another aspect, the invention provides a distributed network backhaul delay system. The system comprises a plurality of cellular base transceiver stations and a plurality of network backhaul delay elements. Each of the plurality of network backhaul delay elements is located at a central office, and each of the plurality of network backhaul delay elements is associated with a different one of the plurality of cellular base transceiver stations. Each network backhaul delay element is configured to adjust and shape relative network delays to minimize network delays between cell sites to enable soft handoff to be performed. Each network backhaul delay element may be further configured to calculate delay information associated with network delays between cell sites. Each network backhaul delay element may be associated with a pseudowire controller. Each pseudowire controller may be configured to perform pseudowire conversions. Each pseudowire controller may be further configured to modify a pseudowire jitter buffer size to alter the network delays between the cell sites. Each network backhaul delay element may further include a pseudowire controller.

In yet another aspect, the invention provides a method of managing backhaul delay in a wireless network. The method comprises the steps of: (a) calculating delay information associated with network delays between cell sites; and (b) adjusting and shaping relative network delays to minimize network delays between cell sites to enable soft handoff to be performed. The method may further include the step of (c) modifying a pseudowire jitter buffer size to alter the network delays between the cell sites. Alternatively, the method may further include the step of (c) managing the network delays. Step (c) may further include the step of (c1) adjusting and shaping the network delays to minimize overall and differential network delays between cell sites. Step (c) may further include the step of (c1) utilizing the delay information to monitor and measure changes in network topology resulting from network reconfigurations. Step (c) may further include the step of (c1) utilizing the delay information to compensate for the network delays. The method may further include the step of (c) modifying packet sizes of packets communicated within the network to alter the network delays between the cell sites.

Substantially all packets in a data stream may be delayed by a predetermined duration. The network delays may be shaped such that the largest delays correspond to the most interior areas of cellular coverage. The wireless network may include wireless mesh backhaul links.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
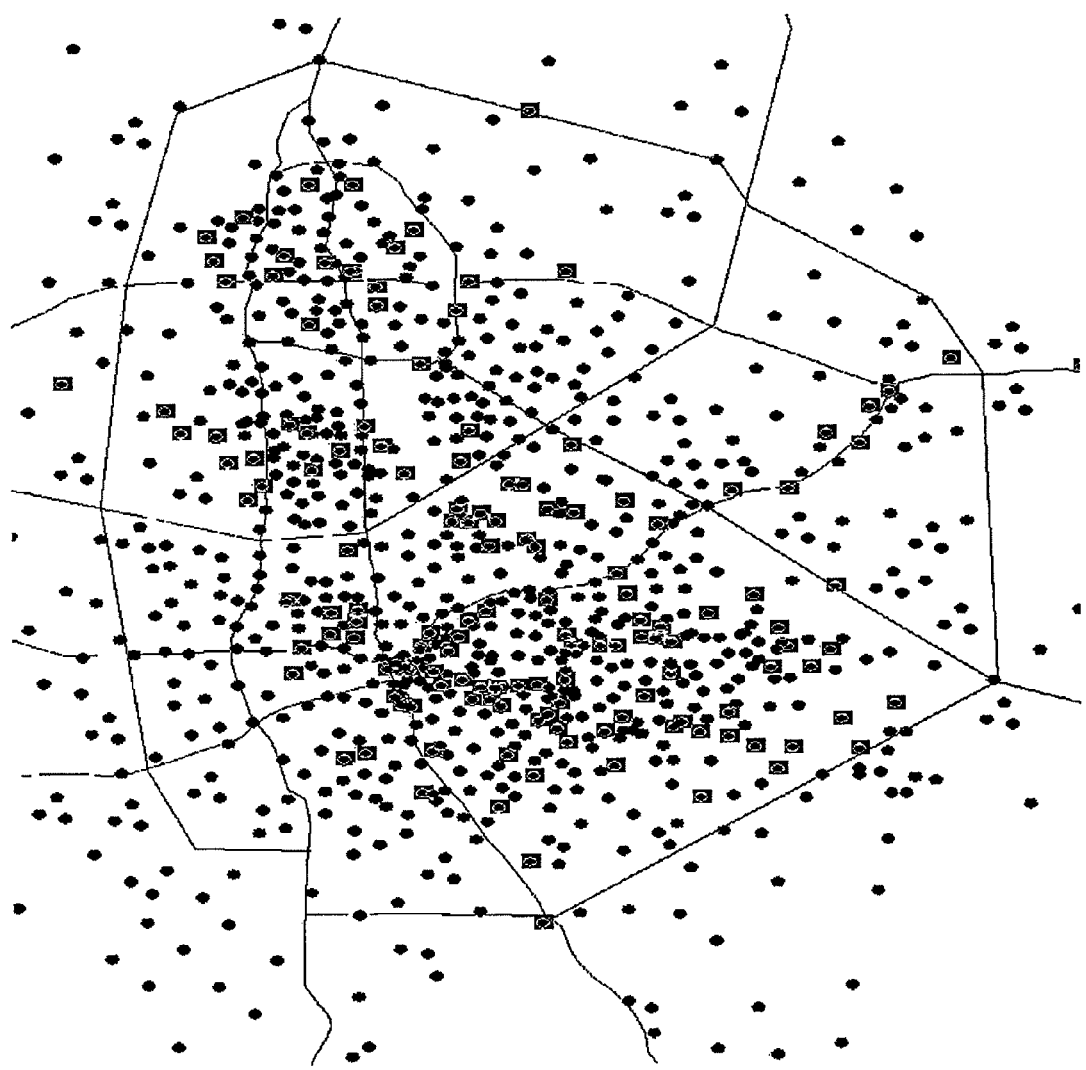
FIG. 1 illustrates a major city, with dots representing cellular towers, in accordance with an exemplary embodiment of the present invention.

Exemplary embodiments of the present invention are directed to a network delay shaping system and method for backhaul of wireless networks, such as, for example, wireless mesh networks and other like wireless networks. The present invention addresses network delay problems resulting from the introduction of wireless mesh backhaul that is used to reduce operating costs. The present invention addresses network delay by presenting a method and means to shape wireless and wired network delays to enable soft handoff to be employed. Exemplary embodiments of the present invention can program the pseudowire jitter buffer sizes and set the packet sizes as a means to control the relative delays between wireless and wired BTS cell sites, although any number of other means known to those of ordinary skill in the art can be employed. For example, packet delays can be employed where all (or substantially all) of the packets in a data stream are delayed by a fixed and programmable duration. Exemplary embodiments can provide the method and means to add and manage delays to guarantee the differential delay between cellular base transceiver stations, whether they be wired or wireless, as well as the means to measure such a delay statically and dynamically using in-band (e.g., using DS0 channels or fractions or concatenations there of), out-of-band (e.g., using signaling bits which may not be part of the DS0 stream), or relative or absolute measurements, such as, for example, Real-time Transport Protocols (RTPs) to determine packet arrival times, and then rely on either the mean delay or fastest packet arrival (leading edge packets) to determine if delay has changed.

Exemplary embodiments of the present invention address not only single wireless hop networks, but also networks with multiple wireless hops, allowing relative delay to be managed when wireless transport means are used to carry data from a central aggregation point, to one or more intermediate points, before reaching the final destination BTS site. Such multiple hop networks further reduce operating costs by increasing the potential number of BTS sites that can be aggregated into a single point. For purposes of illustration and not limitation, if a single wireless hop enabled on average 3 BTS sites to be aggregated into a single location, two wireless hops can allow 9 BTS sites to be aggregated into a single location for cost effective wire-line backhaul.

According to an addition exemplary embodiment, dynamic network reconfigurations of wireless mesh backhaul links can be conducted, in which the overall network delay can change as the transported traffic is rerouted away from failed links to backup links during protection switches. Aggregation into a common egress node can demand redundancy of those nodes to maintain an acceptable network mean time between failure (MTBF) and mean time to repair (MTTR) levels. With such a redundancy comes the requirement to manage the different network delays as the egress points (e.g., to guarantee maximum protection) that may be located in diverse premises resulting in significantly different delays between cell sites.

Additionally, exemplary embodiments of the present invention can provide the method and means by which delay is dynamically monitored, from which decisions can be made to decide if the delay has changed significantly enough to warrant a reprogramming of the elements of the network that control the relative delay offsets.

Figure 2:
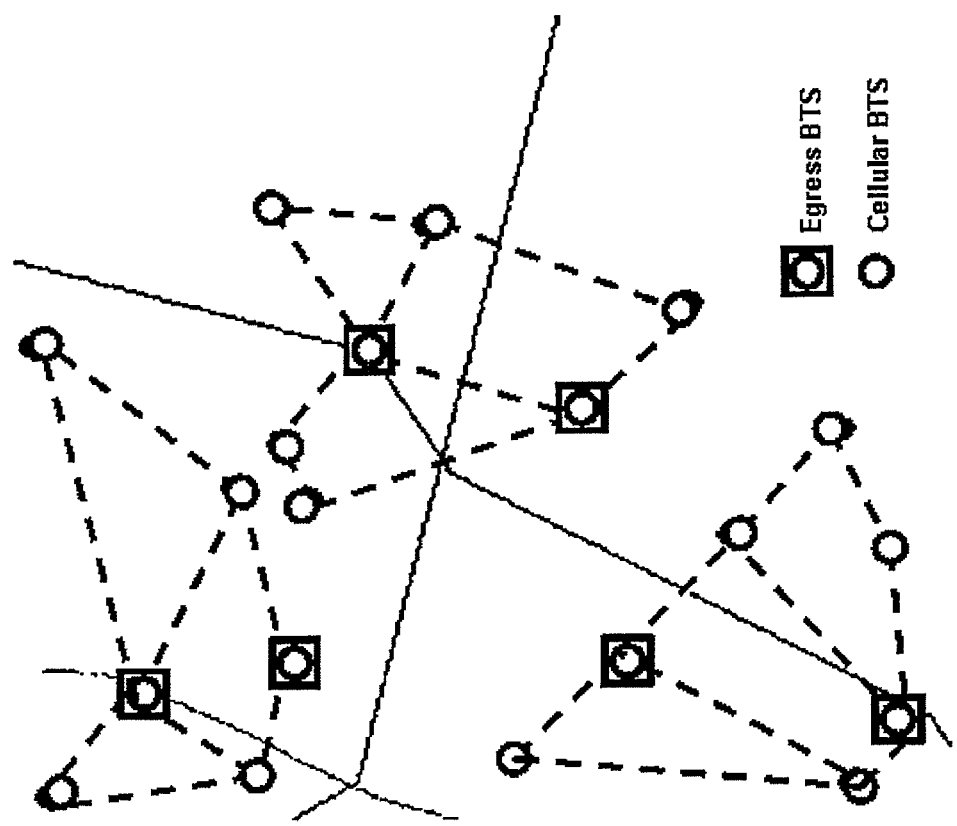
FIG. 2 illustrates a subsection of the major city illustrated in FIG. 1, with the Egress and Cellular BTS sites represented as squares and circles, respectively, in accordance with an exemplary embodiment of the present invention.

FIG. 1 illustrates a major city, with dots representing cellular towers, in accordance with an exemplary embodiment of the present invention. Such cities can contain hundreds or even thousands of cell sites, each requiring wired DS1 (T1 or E1) or other backhaul links. FIG. 2 illustrates a subsection of the major city, with the Egress and Cellular BTS sites represented as squares and circles, respectively, in accordance with an exemplary embodiment of the present invention. The dashed lines represent wireless mesh backhaul links. Many cell sites can be roof-based and can be line of sight (LoS) from other nearby cellular base station sites, making radio backhaul design for these cell sites relatively simple. Within a short period of time, the network can be designed and planned to accommodate limitations, such as, for example, cell sites that are non-LoS, distance limitations affecting cellular link budgets, and maximum allowed number of radio hops that affect total delay.

Figure 3:
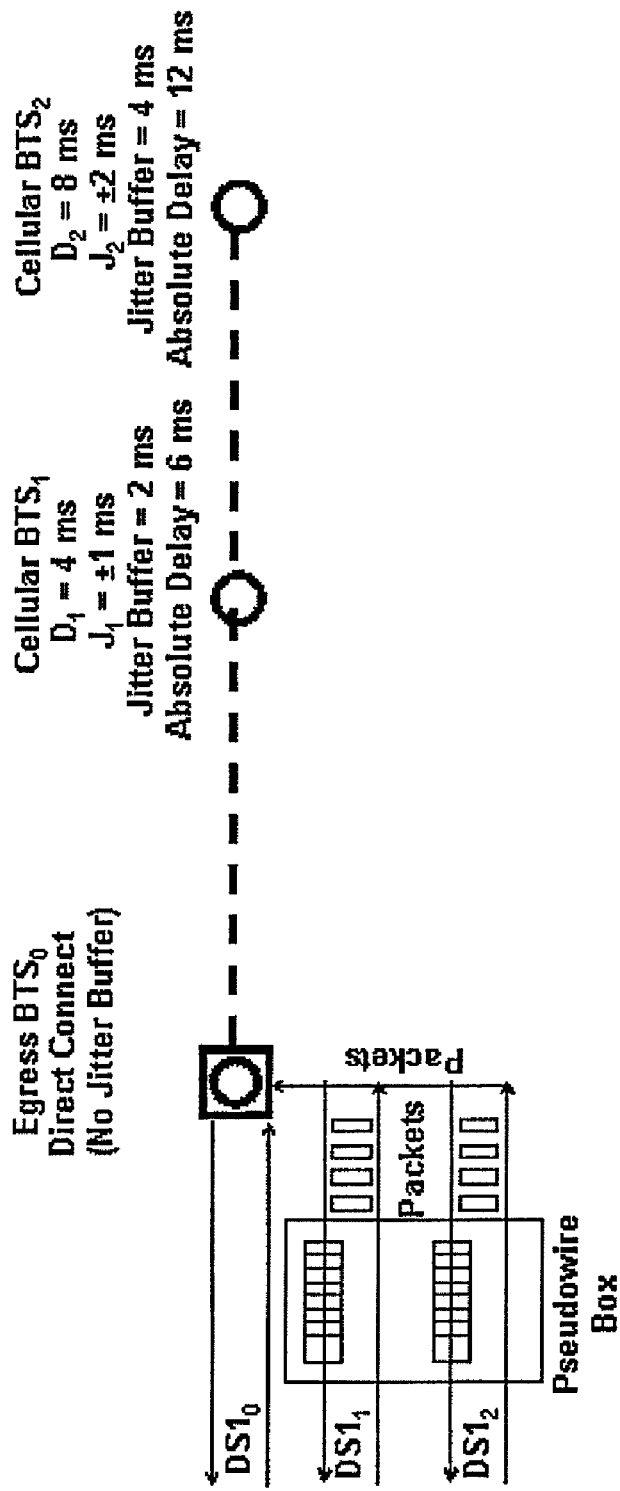
FIG. 3 illustrates a conventional deployment that does not employ the present invention.

According to an exemplary embodiment of the present invention, the wired egress points, shown as squares with circles in them in FIG. 2, are no more than two hops from any of the cell sites. FIG. 3 illustrates a conventional deployment that does not employ the present invention. In FIG. 3, the Egress BTS is directly connected to the $DS1_0$, where as Cellular $BTS_1$ and Cellular $BTS_2$ are connected via the pseudowire box that converts the DS1 time-division- multiplexed (TDM) signals into Ethernet packets. Each BTS site, except the Egress BTS site, has a pseudowire box used to convert the Ethernet packet streams back into DS1 signals, accounting for the absolute jitter. As a result, the absolute delays between the various Cellular BTS sites including the Egress BTS can vary by up to approximately 12 ms. As those of ordinary skill in the art will recognize, absolute numbers for delay and jitter are used for clarity of understanding of the present invention and not for purposes of limitation.

Figure 4:
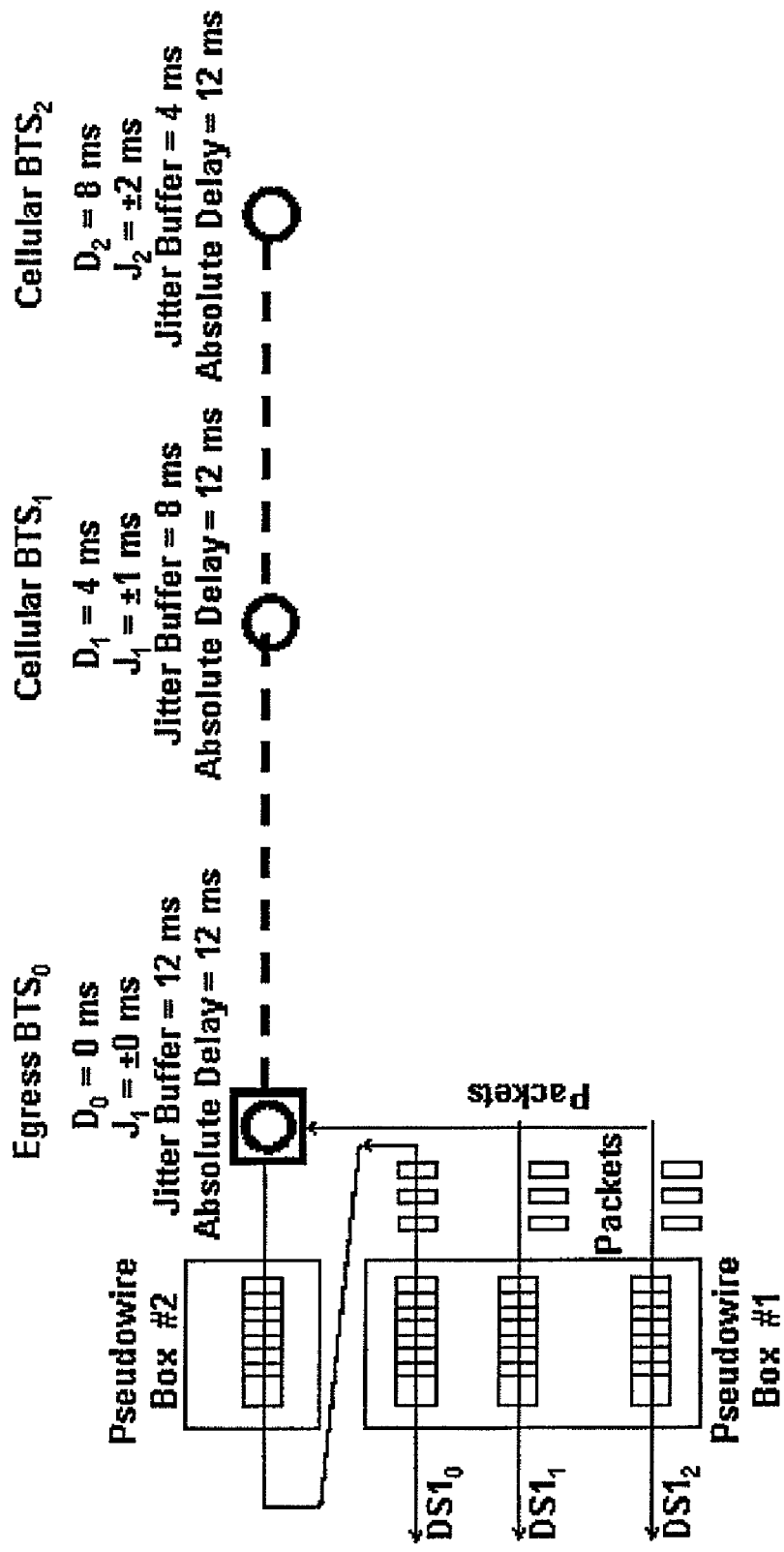
FIG. 4 is a diagram illustrating a configuration in which all cell sites, including the Egress BTS, use DS1s derived via pseudowire conversions, in accordance with an exemplary embodiment of the present invention.

According to exemplary embodiments, all cell sites, including the Egress BTS, use DS1s derived via pseudowire conversions, as illustrated in FIG. 4. The extra pseudowire box at the Egress BTS site enables all BTS sites, including the Egress site, to have their relative delays shaped to guarantee minimum relative delay between cell sites. In such an embodiment, the Egress node jitter Buffer can be set to, for example, 12 ms (even though there is no jitter at that site) to guarantee a delay of 12 ms for this BTS. Cellular $BTS_1$ "sees" a jitter $J_1$ of ±1 ms, but has the Jitter Buffer set to 8 (±4 ms of jitter) to create an absolute delay of 12 ms. Cellular $BTS_2$, with a jitter buffer of 4 ms, "sees" an absolute delay of 12 ms.

All cell sites can require DS1 circuits and can use pseudowire boxes to convert the DS1 circuits into Ethernet data stream to be easily delivered over the wireless packet based networks and reconverted back again to DS1 circuits. Even the egress cell sites, which would normally be directly wired to the DS3 or high rate circuits, can be connected through the same pseudowire circuits. In a preferred embodiment, delay can be added to the wired egress points using the pseudowire boxes to match a mean delay comparable to the delay seen by the first and second hop wireless cellular base stations. According to such an exemplary embodiment, all of the absolute delays can be normalized to the maximum delay of the worse case hop, thereby eliminating delay variations between cell sites that have resulted from the wireless mesh backhaul system employed.

Figure 5:
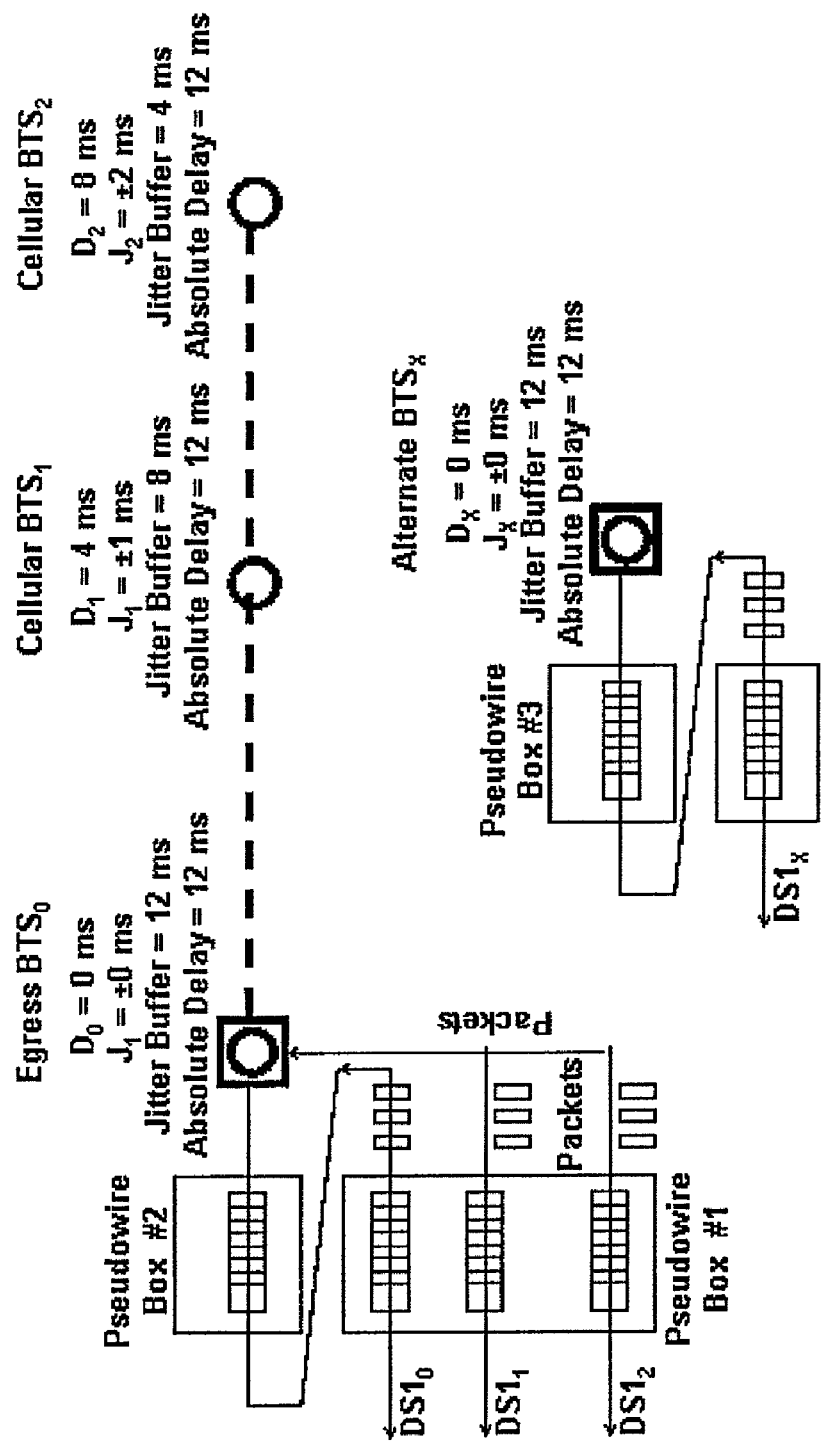
FIG. 5 is a diagram illustrating an "Alternate $BTS_X$" that is not part of the mesh, but has its delay shaped to match the delay of the Egress $BTS_0$ and the Cellular $BTS_1$ and Cellular $BTS_2$, in accordance with an alternative exemplary embodiment of the present invention.

According to an alternative exemplary embodiment of the present invention, the absolute delay of nodes not included in the wireless mesh are modified. FIG. 5 is a diagram illustrating an "Alternate $BTS_X$" that is not part of the mesh, but has its delay shaped to match the delay of the Egress $BTS_0$ and the Cellular $BTS_1$ and Cellular $BTS_2$.

According to an additional exemplary embodiment, the delay shaping can be designed in such a manner as to minimize the delay between the wired and wireless Cellular BTS sites. For purposes of illustration and not limitation, if the relative delay of "Alternate $BTS_X$" were to be greater than the allowed maximum relative delay for soft handover, then "Alternate $BTS_X$" can be programmed to have a lesser delay, such as, for example, 6 ms. Such a lesser delay can be determined to be small enough to allow soft handoff to occur between the reset of the wired BTS sites and Alternate $BTS_X$, and, of course, between Alternate $BTS_X$ and Egress $BTS_0$, Cellular $BTS_1$, and Cellular $BTS_2$.

Figure 6:
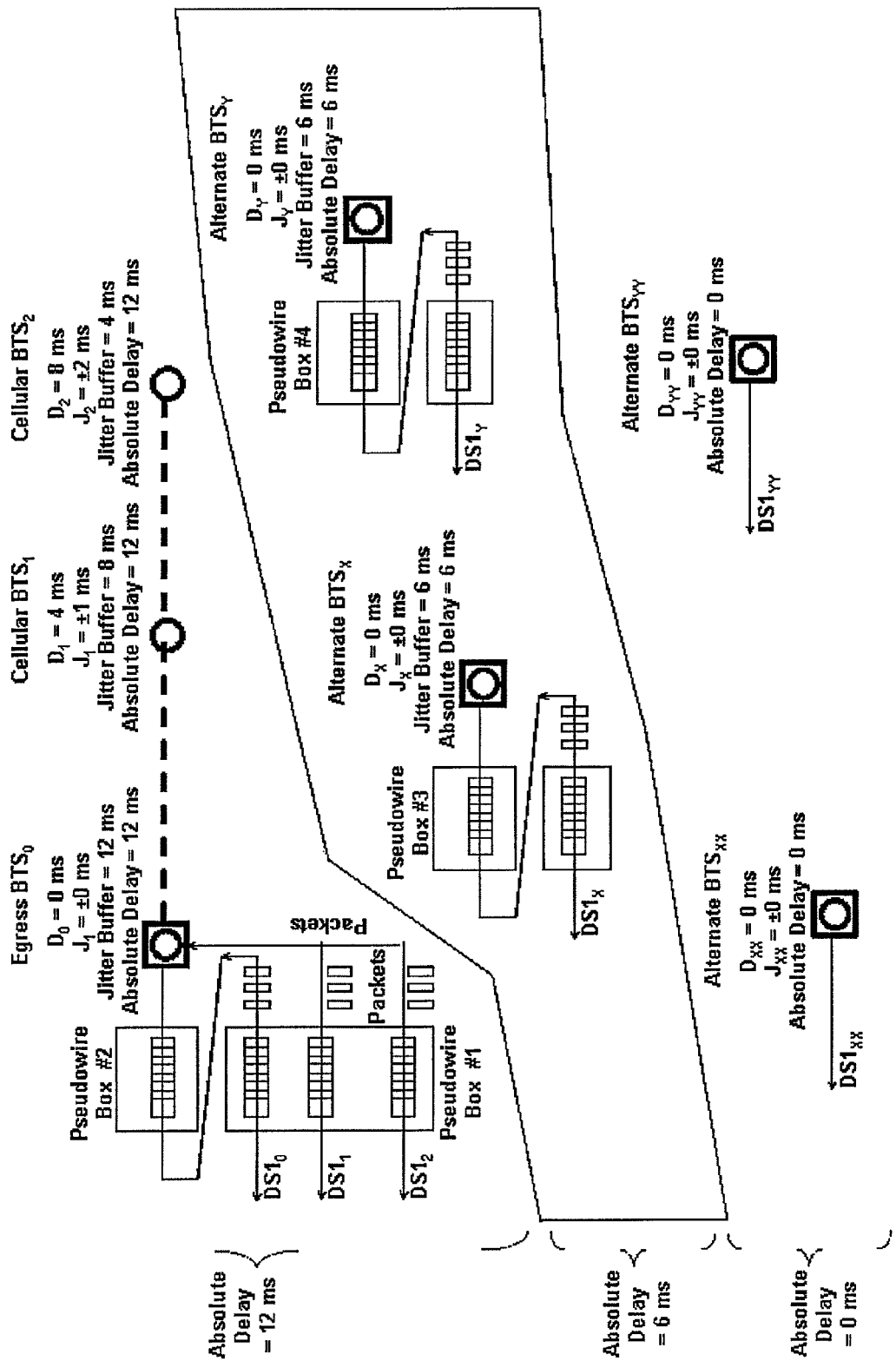
FIG. 6 is a diagram illustrating that the delay can be shaped using "rings" or around regions of wireless backhaul, in accordance with an exemplary embodiment of the present invention.

FIG. 6 is a diagram illustrating that the delay can be shaped using "rings" or around regions of the wireless backhaul, in accordance with an exemplary embodiment of the present invention.

According to a further exemplary embodiment, methods of statically measuring absolute delay can include, for example: i) in-band (e.g., DS0s); ii) out-of-band (e.g., signaling bits); iii) packet arrival time stamps, where additional processing shows the mean delay of the received signal, or the earliest packet arrival, or the latest packet arrival, or filtered calculations based on any or any combination of these; iv) network time protocols; and/or v) any primary reference source stratum traceable timing reference used to time stamp the arrival of the packets or the data/timing information contained within them, including, but not limited to, Global Positioning System (GPS), Long Range Navigation (LORAN), CDMA, Global System for Mobile communications (GSM) systems, Galileo, Global Navigation Satellite System (GLONASS), wide area augmentation system (WAAS), WWVB (i.e., a specialized radio station operated by the National Institute of Standards and Technology), or the like.

According to another exemplary embodiment, methods of dynamically measuring absolute delay can be used to determine if the mesh network has changed its delay, including all of the aforementioned means. In such an exemplary embodiment, the absolute delay changes due to a Rapid Spanning Tree Protocol (RSTP) switch or a 1+1 working/protection switch, where the delay between the working and protection paths are not the same.

Additionally or alternatively, a method of statically determining the delay of all allowed protection paths, including RSTP or Multiple Spanning Tree Protocol (MSTP) or Spanning Tree Protocol (STP) path combinations or working/protection allowed combinations, can be used, such that the delays are predetermined. The delays can be estimated so that during a failure condition the correct delay offsets can be used in the network.

According to an additional exemplary embodiment, a Network Management System, or other similar system, can be used, where the delays to the various BTS systems can be remotely managed.

Additionally or alternatively, any or all of the aforementioned techniques can be applied to fill in coverage "holes" or zones, where the received signal strength is less than a minimum acceptable threshold. In such cases, the wireless mesh is considered the only viable solution. Furthermore, the absolute delay could be quite excessive due to the large numbers of hops, so a preferred method according to exemplary embodiments is to shape the delays so that the most interior areas of coverage have the largest delays.

Exemplary embodiments of the present invention can be implemented as a computer program that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in conjunction with any device, system or process for managing a network, particularly those networks that employ a wireless mesh backhaul.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A distributed network backhaul delay system, comprising:
    a plurality of cellular base transceiver stations; and
    a plurality of network backhaul delay elements, each of the plurality of network backhaul delay elements being located at a central office, wherein each of the plurality of network backhaul delay elements is associated with a different one of the plurality of cellular base transceiver stations, wherein each network backhaul delay element is configured to adjust and shape relative network delays to minimize network delays between cell sites to enable soft handoff to be performed, said each network backhaul delay element shaping the delays such that the largest delays correspond to the most interior areas of cellular coverage of the cell sites.

2. The system of claim 1, wherein each network backhaul delay element is configured to calculate delay information associated with network delays between cell sites.

3. The system of claim 1, wherein each network backhaul delay element is associated with a pseudowire controller, wherein each pseudowire controller is configured to perform pseudowire conversions, and wherein each pseudowire controller is configured to modify a pseudowire jitter buffer size to alter the network delays between the cell sites.

4. The system of claim 3, wherein each network backhaul delay element further comprises a pseudowire controller.

5. The system of claim 1, wherein said each network backhaul delay element shapes the delays to provide a minimum relative delay between said plurality of cellular base transceiver stations.

6. The system of claim 1, wherein each cellular base transceiver station is associated with a pseudowire controller, wherein the pseudowire controller is configured to perform pseudowire conversions, and wherein the pseudowire controller is configured to modify a pseudowire jitter buffer size to alter the network delays between the cell sites.

7. The system of claim 1, further comprising a network management device configured to manage the network delays.

8. The system of claim 7, wherein the network management device is further configured to adjust and shape the network delays to minimize overall and differential network delays between cell sites.

9. The system of claim 7, wherein the network management device is further configured to use the delay information to monitor and measure changes in network topology resulting from network reconfigurations.

10. The system of claim 7, wherein the network management device is further configured to use the delay information to compensate for the network delays.

11. The system of claim 1, wherein each network backhaul delay element is further configured to modify packet sizes of packets communicated within the network to alter the network delays between the cell sites.

12. The system of claim 11, wherein substantially all packets in a data stream are delayed by a predetermined duration.

13. The system of claim 1, wherein the network delays are shaped such that the largest delays correspond to the most interior areas of cellular coverage.

14. The system of claim 1, wherein the network comprises wireless mesh backhaul links.

15. The system of claim 1, further comprising a pseudowire box to substantially match a mean delay corresponding to delays of first and second hop cell sites.

* * * * *